United States Patent
Bearden, Jr. et al.

[15] 3,686,343
[45] Aug. 22, 1972

[54] PARAXYLENE RECOVERY WITH ZEOLITE ADSORBENT

[72] Inventors: Roby Bearden, Jr., 505 Stanford Ave., Baton Rouge, La. 70808; Richard J. De Feo, Jr., 1142 Ashbourne Dr., Baton Rouge, La. 70815

[73] Assignee: Esso Research and Engineering Company

[22] Filed: Oct. 1, 1970

[21] Appl. No.: 77,344

[52] U.S. Cl. ........... 260/674 SA, 23/111, 252/455 Z, 208/310
[51] Int. Cl. .......................... C07c 7/12, C10g 25/04
[58] Field of Search................... 260/674 SA; 208/310

[56] References Cited

UNITED STATES PATENTS

| | | | |
|---|---|---|---|
| 3,130,007 | 4/1964 | Breck | 252/455 |
| 3,114,782 | 12/1963 | Fleck et al. | 260/674 |
| 3,126,425 | 3/1964 | Eberly et al. | 260/674 |
| 3,506,400 | 4/1970 | Eberly et al. | 252/455 |
| 3,558,730 | 1/1971 | Neuzil | 260/674 |
| 3,626,020 | 12/1971 | Neuzil | 260/674 |

*Primary Examiner*—Delbert E. Gantz
*Assistant Examiner*—C. E. Spresser
*Attorney*—Chasan and Sinnock and Michael Conner

[57] ABSTRACT

This application relates to the separation of $C_8$ aromatic mixtures and more particularly the separation of paraxylene from admixture with any combination of its isomers and/or ethylbenzene. The separation is accomplished by contacting a feed stream containing paraxylene and at least one other constituent selected from the group consisting of orthoxylene, metaxylene and ethylbenzene with a modified type Y zeolite containing predominantly potassium ions and having a unit-cell size of 24.50 to 24.75 Angstroms.

13 Claims, No Drawings

PARAXYLENE RECOVERY WITH ZEOLITE ADSORBENT

BACKGROUND OF THE INVENTION

This invention relates to the separation of a xylene from admixture with at least one of its isomers and/or ethylbenzene. More particularly, this invention relates to the separation of paraxylene from the various xylene isomers and/or ethylbenzene by contacting a mixture of paraxylene and at least one of the other xylene isomers and/or ethylbenzene with a predominantly potassium exchange form of type Y zeolite which has been modified so that the unit cell size of the zeolite is between 24.50 and 24.75 Angstroms, preferably between 24.60 and 24.70 Angstroms. The unit cell size of the zeolite may be defined as the smallest unit of structure which can show all the symmetrical properties of the zeolite crystal.

The end result of modification can also be expressed in terms of exchangeable cation content, which is lowered by modification. Specifically, in the range of useful modification the exchangeable sites (i.e., the maximum attainable potassium content) are reduced from approximately 0.50 mole per 100 g of volatile free zeolite to about 0.08 mole per 100 g and preferably to about 0.20 to 0.40 mole/100 g.

The modified zeolite adsorbent of the instant invention is prepared from sodium Y zeolite, the usual form available commercially. The first critical step in the preparation is hydrothermal treatment of the zeolite with an ammonium salt solution (e.g. $NH_4NO_3$ or $NH_4Cl$) to effect replacement of at least 70 mole percent and preferably 80 – 90 mole percent of the zeolite's sodium ion content with ammonium ion. The ammonium Y zeolite is then thermally treated at 600° – 1,400° F., preferably between 800° and 1,100° F for periods of from one-half hour to 16 hours. Thermal treatment in the presence of water vapor or ammonia is essential if structural stability is to be maintained. Finally, the thermally treated zeolite is hydrothermally treated with a potassium salt solution (KCl, $KNO_3$, etc.) to produce a predominately potassium exchanged zeolite.

Paraxylene is a well known compound which is an intermediate in the manufacture of terephthalic acid. Terephthalic acid is subsequently employed in the manufacture of various synthetic fibers such as Dacron which fiber is a trade-marked product of the duPont Company. The ever increasing demand for such fibers has resulted in a corresponding increase in the demand for paraxylene.

Traditionally, paraxylene was recovered by a crystallization process in which mixtures of paraxylene, metaxylene, ortho-xylene and/or ethylbenzene were subjected to several stages of cooling. The cooling served to precipitate a paraxylene-rich crystal fraction from the mixture; filtrate depleted in paraxylene was then recycled for further processing or removed entirely from the system. A process of this type, is successful in recovering paraxylene of high product purity; however, enormous amounts of cooling capacity are required. The cooling capacity along with the plant investment which is needed results in an extremely expensive process. Typical of such crystallization processes is U.S. Pat. No. 2,985,694 Talbot et al., in which three or more stages of crystallization are employed.

In a substantial improvement over the prior art, Eberly et al. in U.S. Pat. No. 3,126,425 discovered a method for separating xylene mixtures on a wide pore molecular sieve. In brief, the patent discloses the use of molecular sieves to separate mixtures of the various xylenes and ethylbenzene. The results achieved by patentees indicate that paraxylene is the least likely of the various isomer to be adsorbed onto a sieve. In fact, the adsorption of meta-xylene was far more successful on the particular sieves designated.

In view of the above-mentioned need for paraxylene a technique for selectively adsorbing paraxylene, which would not require the refrigeration capacity of the current commercial techniques, is needed.

SUMMARY OF THE INVENTION

According to the instant invention it has unexpectedly been discovered that a xylene, preferably paraxylene is preferentially adsorbed from admixture with at least one other aromatic when said mixture is contacted, under adsorption conditions, with a type Y zeolite containing predominantly potassium ions which has been altered (modified) so that its unit cell size is between about 24.50 and 24.75 Angstroms, preferably between about 24.60 and 24.70 Angstroms. The ordinary unit cell size for the predominately potassium exchanged form of a type Y molecular sieve is between about 24.76 and 24.85 Angstroms thus, a substantial difference in size is present.

This difference is reflected in a far improved separation of paraxylene from ethylbenzene relative to that obtained with para-xylene adsorbents of record. As noted in the prior art the limiting separation for the respective adsorbents is the paraxylene ethylbenzene separation. Furthermore, the improved separation of paraxylene from ethylbenzene exhibited by the modified type Y zeolite is realized without serious loss of ability to separate paraxylene from other isomers, namely, meta-xylene and ortho-xylene.

By predominantly potassium ions it is meant the maximum concentration of potassium attainable by repetitive hydrothermal exchanges with a potassium salt solution. Depending on the severity of the thermal treatment prior to the hydrothermal exchange, this concentration can range from 0.08 mole/100 gram of volatile free zeolite to approximately 0.40 mole/100 gram and preferably from 0.20 mole to 0.40 mole/100 g. Small residual concentrations of sodium cation (<0.002 mole/100 g) are also present as well as a hydrogen ion content of undetermined level.

Thermal treatment of the ammonium-Y zeolite in the presence of water vapor has been thoroughly characterized by Eberly et al. in U.S. Pat. No. 3,506,400. The following concurrent results are noted: (1.) Decomposition of the ammonium cation with liberation of ammonia. (2.) Emergence of the hydrogen-Y zeolite structure. (3.) Rejection of alumina from the zeolite lattice and (4.) A reduction in the exchangeable cation content.

In the absence of water vapor the ammonium ion decomposition also leads to a hydrogen-Y structure. However, the material is not stable to moisture and will decompose (loss of crystallinity) even if exposed to atmospheric moisture. By contrast, the zeolite structure obtained by heating the ammonium-Y zeolite in the presence of water vapor (ammonia may also be used) is exceptionally stable and can be used for long periods in the presence of steam at high temperature (1,000° F+) without loss of structure. Clearly, since the thermally treated ammonium-Y zeolite of the instant invention is to be hydrothermally exchanged with a potassium salt solution it is essential that the thermal treatment be carried out in the presence of water vapor.

The hydrogen ion content of the steamed ammonium-Y zeolite is normally less than one-half that of the material obtained by thermal treatment in the absence of water. Obviously the steam treatment has resulted in a reduction in the cation content, a phenomenon thought to be directly related to loss of alumina from the zeolite structure. That the exchangeable cation content has been lowered by steaming is also apparent as evidenced from a comparison of the maximum potassium level attainable by hydrothermal exchange both before and after the steam treatment of the ammonium-Y zeolite.

The phenomenon of alumina rejection is readily observed in a reduction in unit cell size or compaction of the zeolite crystalline lattice. The silica-alumina molar ratio of the crystalline lattice also increases, but the rejected amorphous alumina remains in the gross zeolite structure and must be carefully extracted if the precise value of the ratio is to be determined. The effects of thermal treatment on zeolite properties is summarized in Table II of Example 1.

Adsorption may take place in either the liquid or vapor phase; however, if the liquid phase is utilized it is much preferred to pass an inert carrier liquid over the adsorbent bed in conjunction with or immediately following the feed steam. The adsorption of the paraxylene may take place at temperatures which vary broadly between 30° and 850° F, pressure may vary between 0.01 and 50 atmospheres.

Desorption of the xylene saturated zeolite is readily achieved with any one of a number of polar agents, which include water, simple alcohols, ketones, ethers, halogenated aliphatic hydrocarbons, naphthenes and aromatics other than $C_8$. However, since it is desirable to operate a separation process isothermally it is essential that adsorption and desorption be easily reversible steps or cycles. That is to say it should be possible to remove the adsorbed phase by mass action displacement. The strongly polar agents (alcohols, ethers, ammonia, ketones, etc.) meet this requirement for operation in the 250°–500° F range, but are best substituted by less polar agents (e.g. aromatics) below 250° F. The modified adsorbent of the instant invention having been formed in part by high temperature treatment with steam is particularly stable toward steam and is thus particularly amenable to desorption with steam. Again, the operating temperature must be above about 250° F to insure facile reversal of steam desorption by treatment with fresh xylene feed.

Paraxylene is usually found in admixture with orthoxylene, meta-xylene and ethylbenzene. It is within the scope of the instant invention to separate paraxylene from at least one of the previously mentioned constituents or, alternatively, any combination including all of them. The order of adsorptive ability of the predominantly potassium exchanged modified type Y sieve is paraxylene > ethylbenzene > meta-xylene > ortho-xylene. The instant invention can by proper choice of feed stream and staging, be used to separate any one isomer from another. It should be emphasized that only a predominantly potassium exchanged form of the modified type Y zeolite may be used for the separations which are effected by the instant invention.

The predominantly potassium exchanged form of the modified zeolite must exhibit a unit cell size between 24.50 and 24.75 Angstroms, preferably 24.60 and 24.70 Angstroms.

With more particularity, the zeolite which is to be utilized as the adsorbent in the instant invention is made by exchanging 70 – 98 percent, then thermally treating in the presence of steam or ammonia, preferably steam, at a temperature in the range of 600° – 1,400° F for periods of from one-half hour to 16 hours, preferably at 800° - 1,100° F for 1 to 4 hours and most preferably at 900° – 1,000° F for 1 to 2 hours, and finally exchanging residual sodium, ammonium and hydrogen cations with potassium to produce a predominantly potassium exchanged, modified Y zeolite.

In U.S. Pat. No. 3,130.007 there is described the zeolite type Y molecular sieve; the disclosure of this patent is herein incorporated by reference. The crystals of zeolite Y are basically three-dimensional frameworks of $SiO_4$ and $AlO_4$ tetrahedra cross-linked by the sharing of oxygen atoms. The valence of each tetrahedron containing aluminum is balanced by the presence in the aluminosilicate framework of a cation such as a sodium metal ion. The void spaces in the framework are occupied by water molecules. Dehydration to effect the lowest order of hydration results in a crystal interlaced with channels of molecular dimensions which offer high selectivity and surface area for the adsorption of particular molecules. The basic chemical formula for zeolite Y expressed in terms of the metal oxides is shown below:

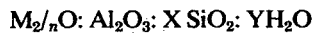

$$M_{2/n}O: Al_2O_3: X\ SiO_2: YH_2O$$

Where $n$ represents the valence of the cation M and X and Y represent the number of moles of $SiO_2$ and of water.

According to the process of the invention the sodium form of the type Y molecular sieve is treated hydrothermally with an aqueous solution of an ammonium salt; chloride, nitrate or carbonate are preferred. The treatment involves agitation of the powdered type Y zeolite particles with the solution at temperatures from about ambient to about 180° to 220° F. An excess of ammonium ion is present above that required to replace the sodium ions ordinarily found in type Y zeolite stoichiometrically. A minimum of a 2-mole excess is preferred. After equilibration of the zeolite with the exchange solution, usually in 1 to 2 hours, the excess liquid is removed by filtration, decantation, or centrifugation. A second treatment is then carried out in the same manner, followed by a third and fourth if it is desired to obtain the maximum exchange of ions. A minimum of at least two treatments should be employed.

The liquid is removed and the solid particles are washed free of excess salt.

After the exchange the zeolite is modified so that the unit cell size is reduced from about 24.72 Angstroms to about 24.44 A , preferably to about 24.50 to 24.70 A and most preferably 24.58 to 24.66 A. The unit cell size is modified by thermal treatment in the presence of water vapor according to the general procedure specified by Eberly et al. in U.S. Pat. No. 3,506,400 herein incorporated by reference. The treatment consists of heating the ammonium-Y zeolite at an elevated temperature within the range of about 600° – 1,400° F in an atmosphere containing at least 2 percent water by weight for a period of time sufficient to effect removal of at least some alumina tetrahedra from the crystal lattice of the zeolite. In a preferred embodiment the $NH_4$-Y zeolite is heated at 900° F in an atmosphere of steam for a period of 1 to 2 hours.

The thermally modified form of the type Y zeolite is then treated hydrothermally with an aqueous solution of a potassium salt; chloride, nitrate or carbonate are preferred. The treatment involves agitation of the powdered type Y zeolite particles with the solution at temperatures from about ambient to about 180° to 220° F. An excess of potassium ion is present above that required to replace the sodium ions ordinarily found in the unmodified type Y zeolite stoichiometrically. A minimum of a 2-mole excess is preferred. After equilibration of the zeolite with the exchange solution, usually in 1 to 2 hours, the excess liquid is removed by filtration, decantation, or centrifugation. A second treatment is then carried out in the same manner, followed by a third and fourth if it is desired to obtain the maximum exchange of ions. A minimum of at least two treatments should be employed.

The liquid is removed and the solid particles are washed free of chloride ions, if potassium chloride is used as the exchange salt or source of potassium ions. The solid particles are then dried, and form into pellets, extrudates, or any other desired form for use. They are calcined at temperatures of up to about 1,200° F., in air or nitrogen, prior to actual use in order to remove any excess water and to destroy any nitrate or carbonate ions which remain if these materials are used as exchange salts.

Conversion of thermally treated Y zeolite to the predominantly potassium exchanged form produces a unit cell size increase of approximately 0.02 to 0.04 A. Thus while the preferred unit cell size range of thermally treated Y zeolite is about 24.58 to 24.66 Angstroms, the preferred range after potassium exchange is about 24.60 to 24.70 Angstroms.

The feed stream for the separation process of the instant invention may be obtained from any of several sources. Briefly, a mixed $C_8$ aromatic feed stream containing the various xylene isomers and ethylbenzene may result from the steam cracking of hydrocarbon oils, from coal tar sources, or from the reforming or hydrocarbon oils in petroleum process operations. In any case, a $C_8$ aromatic fraction is concentrated prior to separation, by distillation or other suitable means. In addition, the $C_8$ aromatic product or feed stream to an aromatic isomerization process may be used as feed for the instant process.

Any combination of paraxylene and the other xylene isomers and/or ethylbenzene would provide a suitable feed stream for the instant invention. The feed stream is passed over the predominantly potassium exchanged modified type Y zeolite in either the liquid or vapor phase.

If the feed stream is in the liquid phase an inert carrying agent may be passed over the zeolite in conjunction with or immediately after the feed stream.

Inert carriers which may be utilized include the following: Aromatics which are less tightly adsorbed than the xylenes, paraffins (both normal and iso-), olefins, naphthenes, and mixtures of the above. The basic requirements for an inert carrier are: (1) a liquid at adsorption conditions which does not react with the xylenes or zeolite at adsorption or desorption conditions; (2) which can easily be separated from the xylene product. Examples are paraffins from $C_2$ to $C_{18}$ (iso and normal), olefins from $C_2$ to $C_{18}$ (normal and branched), benzene, Tetralin, Decalin, and halogenated derivatives of the above. The preferred diluents for use as wash agents are low molecular weight paraffins, and olefins. These are effective wash agents for unadsorbed xylene removal and can be easily separated from the paraxylene product, e.g., pentane, isopentane, hexane, pentene, etc. In the absence of the diluent wash a vapor phase introduction of the feed stream is preferred.

The diluent if incorporated with the feed would compose about 10 to 90 wt. percent of the feed stream, preferably 30 to 70 wt. percent and most preferably 40 to 60 wt. percent. The presence of the diluent is important to successful operation in the liquid phase because the diluent serves to sweep the interstices of the zeolite adsorbent while the feed stream is passed over it. The preferred method of using liquid phase adsorption would be as follows:

1. The mixed xylene and/or ethylbenzene feed stream would be fed over the adsorbent in the liquid phase, either undiluted or with an inert liquid carrier, until the desired effluent composition is obtained, this may be equilibrium where the effluent and feed stream have the same composition.
2. An inert liquid carrier is passed over the adsorbent to wash the non-adsorbed xylene impurities from the interstices
3. The adsorbent is desorbed by steam or other means producing a desorbate which contains pure paraxylene and the inert carrier liquid.
4. The paraxylene product and carrier liquid is separated by fractionation on or other conventional means.

Thus, when desorption takes place the product recovered is essentially paraxylene and contaminants such as ethylbenzene, meta-xylene or ortho-xylene are minimized since they have been swept from the interstices and are substantially absent from the adsorbent.

The mixture is passed over the adsorbent in the vapor phase at a rate of 0.01 to 10 W/hr./W, preferably 0.1 to 5 W/hr./W. In the event that the feed stream is passed over the adsorbent in the liquid phase, a feed rate of 0.1 to 5 W/hr./W may be utilized, preferably 0.2 to 2 W/hr./W.

It is also preferred that the adsorption technique of the instant invention be cyclic, but a continuous process is intended to be within the scope of the instant invention.

Typical cycle times will vary between 2 and 480 minutes preferably 10 – 240 minutes and most preferably 15 – 120 minutes. Temperatures during adsorption may vary widely in the vapor phase. Acceptable limits would vary from 200°– 800° F, preferably 200° - 700° F, and most preferably 300° - 600° F. In the liquid phase the temperature may vary between 30° and 300° F. while preferred temperatures are between 50° and 200° F. and most preferably 70° and 150° F. The pressure may vary widely; acceptable limits are between 0.1 and 700 psig, in both the liquid and vapor phases. For a vapor phase operation, a preferred pressure would be between 0.1 and 100 psig and most preferably between 10 and 50 psig. Pressure in the liquid phase should be sufficient to maintain liquid phase at the temperature utilized.

A typical mixture which would be treated by the process of the instant invention would have about 10 to 30 wt. percent of para-xylene, 30 to 50 wt. percent of meta-xylene, 10 to 30 wt. percent of ortho-xylene and 10 to 30 wt. percent of ethylbenzene.

It should be emphasized that although the preferred separation of the instant invention is that of para-xylene from at least one of its isomers and/or ethylbenzene, the instant invention may be used to obtain any one of the $C_8$ aromatics used in pure form by proper use of adsorption and desorption techniques and stages. As mentioned, previously, there is a definite order in which the various xylene isomers and ethylbenzene will be attracted to a predominantly potassium exchange modified type Y zeolite.

The zeolite must, as mentioned previously, be modified so that the unit cell size after potassium exchange is between 24.50 to 24.75 Angstroms and preferably 24.60 to 24.70 Angstroms. While the most effective separation utilizing the instant sieve is that of ethylbenzene and paraxylene, the separation of para-xylene and meta-xylene may also be performed effectively. Typical alphas for the separation of ethylbenzene and paraxylene are 3.5 to 4.5; alphas for the separation of ethylbenzene and metaxylene are 3.5 to 7.0; alphas for the separation of paraxylene and orthoxylene tend to be between 3.5 and 6.0. The definition of alpha is as follows: paraxylene $$\text{Alpha (Equil.)} = \frac{\left.\frac{\text{Mole fraction para}}{\text{Mole fraction other } C_8}\right\} \text{Adsorbed phase}}{\left.\frac{\text{Mole fraction para}}{\text{Mole fraction other } C_8}\right\} \text{Feed}}$$

As the expression denotes the alpha values measured are actually equilibrium alpha values. Experimentally, they are obtained by passing a feed mixture containing para-xylene, meta-xylene, ortho-xylene and ethylbenzene over a column of freshly-calcined adsorbent until effluent composition matched that of the feed, i.e., until the adsorbed and external phases were at equilibrium. If operating liquid phase, excess feed was then swept from the column with a n-paraffin wash of precisely 1.2 volumes per volume of adsorbent (14–35 mesh particles). The adsorbed phase was then desorbent with an appropriate agent, usually methyl alcohol. For vapor phase operation the excess feed was removed by purging the column with nitrogen and the adsorbed phase was then desorbed with methyl alcohol vapor or with steam. The feed and desorbate were analyzed by vapor phase chromatography.

Precision of the liquid phase alpha determination was found to depend on the precision of the hydrocarbon wash used to remove excess feed from the column. The reason is that the n-paraffin can act as a very mold desorption agent which selectively removes the isomers of para-xylene.

Following each paraxylene adsorption cycle on the adsorbent, the para-xylene will have to be desorbed. Due to the stable nature of the thermally modified type Y zeolite, steam desorption may be used. Since it is readily available, and quite economical it is most preferred to use steam for desorbing paraxylene or any other compound adsorbed onto the predominantly potassium, modified type Y zeolite. The steam would be maintained at a temperature of 200°–700° F., preferably 200°–500° F. during desorption Pressure would vary between 0.1 and 300 psig, preferably 10 and 100. The steam is passed over the bed at a rate of 01 to 10 W/hr./W, preferably 0.5 to 2 W/hr./W Paraxylene recovered from the adsorbent after the desorption may be readily separated from the steam. Both para-xylene and steam are cooled to condense them into the liquid phase. The liquids are collected in a settling vessel and the water layer drawn off the bottom of the vessel. The hydrocarbon or para-xylene layer is removed from the top of the vessel and may be recovered as is or dried by treatment with an appropriate drying agent such as alumina, silica gel of a 4A molecular sieve or other means which are well known in the art.

Alternatively, other well-known desorption techniques may be utilized. These techniques would include desorption by means of vacuum; a pressure in the range of 0.01 to 5 psig would be utilized for a period of 10 to 120 minutes, at a temperature of 100° to 600° F. Additionally, any of the well-known desorbing agents may also be used in the instant process. Thus, desorption may be effected by passing a normal paraffin such as those generally in the range of $C_4$ to about $C_{12}$, i.e., normal pentane over the loaded bed at elevated temperatures. Aromatics may also be used to displace the para-xylene from the bed at elevated temperatures. Polar displacing agents such as $SO_2$, carbon dioxide, alcohols, glycols such as ethylene glycol and propylene glycol, halogenated compounds such as methyl chloride, ethyl chloride, methyl fluoride, nitrogenated compounds such as nitromethane and the like, may also be used to desorb the zeolite.

The displacing agents may be passed over the adsorbent countercurrently or cocurrently; a countercurrent desorption cycle is preferred. Typical temperatures during desorption will vary between 30° and 700° F., preferably 300° and 600° F. and most preferably at the same temperature used in the adsorption cycle. Pressures would vary between 0.1 and 700 psig, preferably 10 and 100 psig. Typical cycles for desorption would vary between 10 and 120 minutes, preferably 20 and 60 minutes.

Following repeated adsorption-desorption cycles the predominantly potassium type Y sieve will tend to lose capacity. Substantially all of this capacity may be regained by burning the sieve.

It should be emphasized that the above method for adsorbing and desorbing para-xylene is equally applicable to the other $C_8$ aromatics which are adsorbed less preferentially onto the modified predominantly potassium type Y zeolite.

The method of measuring the unit cell size is as follows:

Unit cell measurements were made using a Norelco X-ray diffractometer with a nickel-filter copper K radiation. The instrument was operated with 50 Kv operating potential and 20 ma. The sample to be run was mixed with about 10 percent of an alpha alumina internal standard and scanned from about 53.5° two-theta to about 58.5° two-theta at a goniometer speed of 0.25° per minute and a chart speed of one-half inch per minute.

An angle correction factor was determined from the observed and theoretical values for the two-theta line of alpha alumina and applied to the two-theta line for the sample. The corrected value was converted to a "$d$" value (interplaner spacing) using the Bragg equation:

$$\eta\lambda = 2d\sin\theta$$

where:
$\eta$ = order of reflection
$\lambda$ = radiation wavelength

Calculation of the unit cell size, $\mathcal{A}_0$, was made from the expression for the spacing of the planes ($h, k, l$) in a cubic lattice:

$$\mathcal{A}_0 = d\sqrt{h^2 + l^2 + k^2}$$

For this particular measurement the expression is:

$$\mathcal{A}_0 = d(14.5258)$$

SPECIFIC EMBODIMENTS

Example 1

This example illustrates the preparation and properties of four different versions of the modified, predominantly potassium exchanged Y zeolite adsorbents.

STEP A PREPARATION OF THE AMMONIUM Y ZEOLITE

A commercially available sodium-Y zeolite, Grade SK–40 from Union Carbide, was exchanged hydrothermally three times with a threefold molar excess (based on sodium content of Y zeolite) of ammonium nitrate in water solution. Each exchange was conducted for 90 minutes at 120° F and the Y-zeolite was recovered by filtration prior to the second the third exchanges. Following the final exchange the zeolite particles were washed free of excess ammonium nitrate with distilled water, filtered, and partially dried at 250° F for use in Step B. Zeolite characteristics are given in Table I.

TABLE I

Physical Characteristics of the Sodium and Ammonium-Y Zeolites

| | Na-Y Zeolite | NH$_4$-Y Zeolite |
|---|---|---|
| Cation Assay, Mole % | Na, 100 | Na, 20 |
| | — | NH$_4$, 80 |
| SiO$_2$/Al$_2$O$_3$ mole ratio | 4.87 | 4.87 |
| Unit Cell Size, A | 24.68 | 24.72 |

STEP B THERMAL TREATMENT IN THE PRESENCE OF STEAM

The ammonium-Y zeolite from Step A was placed in an open dish suspended in muffle furnace equipped with a steam inlet line. The sample was heated in air until the temperature rose to 300° F. At that point steam was introduced and the sample temperature was raised over the course of approximately one hour to the desired treatment temperature. The effect of variation in treatment temperature and time is shown in Table II below. As the data show decomposition of the ammonium cation is essentially complete after 900° F treatment for one hour. However the phenomenon of alumina rejection, as evidenced by decrease in unit cell size and increase in the SiO$_2$/Al$_2$O$_3$ ratio, becomes more pronounced as the severity of the treatment is increased.

TABLE II

Properties of Ammonium-Y Zeolite After Thermal Treatment in the Presence of Steam

| | | | Y-Zeolite Properties | | |
|---|---|---|---|---|---|
| Preparation | temp. °F | time hrs. | Unit cell size, A | SiO$_2$/ Al$_2$O$_3$ ratio | Moles NH$_4$ per 100 g Dry Zeolite |
| NH$_4$-Y Zeolite | none | none | 24.72 | 4.87 | 0.347 |
| A | 900 | 1 | 24.67 | 5.00* | <0.005 |
| B | 900 | 2 | 24.65 | — | <0.005 |
| C | 1100 | 2 | 24.51 | (7.50)* | <0.005 |
| D | 1200 | 16 | 24.47 | — | <0.005 |

*Determined by extracting the rejected, amorphous alumina by aqueous contact with an acidic ion exchange resin.

STEP C PREPARATION OF THE PREDOMINANTLY POTASSIUM EXCHANGED ADSORBENTS

The various preparations of Step B were exchanged hydrothermally three times with a threefold molar excess (based on sodium content of the starting material) of potassium chloride. Each exchange was conducted for 90 minutes at 120° F and the Y-zeolite was recovered by filtration prior to the second and third exchanges. Following the final exchange the zeolite particles were washed free of excess potassium chloride, dried, and formed into 14–35 mesh particles for adsorption studies.

That alumina rejection and loss in ion exchange capacity are interrelated is seen from the data in TAble III which shows the decrease in exchange capacity for potassium with decreasing unit cell size. The data further illustrate that a slight increase in unit cell size accompanies preparation of the predominantly potassium exchanged form of the modified Y-zeolite.

TABLE III

Exchange Capacity Decreases With Decreasing Unit Cell Size

| | | After hydrothermal Potassium exchange | |
|---|---|---|---|
| Preparation | Unit cell size, A | Moles K/100g zeolite* | Unit cell, A |

| | | | |
|---|---|---|---|
| NH₄-y zeolite | 24.72 | 0.430 | 24.81 |
| A | 24.67 | 0.280 | 24.70 |
| B | 24.65 | 0.220 | 24.69 |
| C | 24.51 | 0.160 | 24.58 |
| D | 24.47 | 0.100 | 24.52 |

*After calcination at 750°F with dry nitrogen flush for 3 hours.

Example 2

This example contrasts the superior performance of the predominately potassium exchanged modified Y zeolite adsorbent with another potassium zeolite for the separation of para-xylene from ethylbenzene.

TEST PROCEDURES

A. For Liquid Phase Operation At 78° F

Adsorbent in the form of 14–35 mesh particles was calcined at 750° F for 3 hours with a dry nitrogen purge. A 50 gram charge was then placed in a vertical glass reactor equipped with a temperature control and heating system. A mixed isomer feed, composition below, was passed downflow over the column at a rate of approximately 1.75 W /hr./W until a total of 173 grams of feed had been added. This amount constituted approximately 73 g. in excess of the minimum amount needed to attain a state of equilibrium adsorption i.e., until gas chromatographic analysis showed that the effluent composition was identical to that of the feed.

FEED COMPOSITION (weight %)

| ISOMER | |
|---|---|
| para-xylene | 20.0 |
| meta-xylene | 46.0 |
| ortho-xylene | 20.0 |
| ethylbenzene | 14.0 |
| Total: | 100.0 |

Excess feed was then swept from the adsorbent interstices with a wash of 41 g. of n-pentane (or 1.2 volume of pentane/volume of adsorbent) at a rate of approximately 3 W/hr./W. The column was then desorbed by washing with 50 g. of anhydrous methyl alcohol. Desorbate composition was determined by vapor phase chromatography. Alternatively, without change in the results, the column could be desorbed by heating to 350° F and treating with steam.

B. For Vapor Phase Operation At 320° F

For vapor phase operation the mixed isomer feed was first fed to a vaporizer vessel operating at approximately 400° F and then vapor was passed downflow over the column at approximately 1.0 W/hr./W. A total of 40 g. of mixed isomer feed was used which was found to be in excess of the amount needed to reach equilibrium adsorption. Excess feed was swept from the column with nitrogen and the column was desorbed with steam.

The results of the tests are summarized in Table IV.

TABLE IV

A Comparison of Adsorbent Performance

| Adsorbent | Test temp. °F | Desorbate comp. (wt.%) Et Bz | para | meta | ortho | Alpha Values P/EB | P/M | P/O |
|---|---|---|---|---|---|---|---|---|
| Defeo(1) | 78 | 19.9 | 67.5 | 10.4 | 2.2 | 2.4 | 15.0 | 30.0 |
| Prep. A of Example 1 | 78 | 9.2 | 55.7 | 24.5 | 9.5 | 4.2 | 5.2 | 5.8 |
| Defeo(1) | 320 | 16.6 | 40.8 | 27.1 | 15.5 | 1.7 | 3.5 | 2.6 |
| Prep. A of | 320 | 11.5 | 35.2 | 35.2 | 18.1 | 2.2 | 2.5 | 2.0 |

(1)A potassium-y zeolite prepared by hydrothermal exchange of the SK-40 sodium-y zeolite.

The data show that the new adsorbent, of which preparation A is an example, provides a very significant improvement in para-xylene/ethylbenzene separation particularly for liquid phase operation near 100° F. Some effectiveness is lost with the new adsorbent for separating para-xylene from meta-xylene and ortho-xylene. However, process economics favor the new adsorbent if the process objective is solely the recovery of para-xylene and not the separation and recovery of all isomers.

Example 3

The variation of adsorbent characteristics with variation in the degree of thermal treatment used in their preparation is shown in Table V. The adsorbent preparations are those identified in Table III of Example 1. Adsorption tests were made at 78° F following procedure A of Example 2.

TABLE V

Variation in Adsorbent Characteristics

| Preparation | thermal °F | treat Hrs. | capacity for xylenes W/W absorbent | Alphas P/EB | P/M | P/O |
|---|---|---|---|---|---|---|
| A | 900 | 1 | 0.155 | 4.2 | 5.2 | 5.8 |
| B | 900 | 2 | 0.153 | 3.6 | 3.3 | 3.4 |
| B | 1100 | 2 | 0.141 | 3.2 | 2.5 | 2.5 |
| D | 1200 | 16 | 0.113 | 3.0 | 2.1 | 2.2 |

The data show data show that the preferred thermal treatment conditions constitute something less severe than the 2 hour treatment at 1,100° F (Preparation C). Higher severity has the undesirable feature of lowering the overall effectiveness of adsorbent selectivity as well as the capacity for xylene adsorption. It is appreciated, however, that temperature and time are interchangeable variables to a certain extent and that the desirable results obtained at 900° F for 1 hour Prep. A could possibly be equalled if not improved on by resorting to longer treatment periods at lower temperatures or very brief treatments at temperatures above 900° F.

What is claimed is:

1. A process for preferentially adsorbing a $C_8$ aromatic from admixture with at least one other $C_8$ aromatic which comprises contacting said mixture under adsorption conditions with a predominantly potassium type Y zeolite, said zeolite having a unit cell size of 24.50 to 24.75 Angstroms wherein at least a portion of said preferentially adsorbed $C_8$ aromatic is adsorbed onto said zeolite, and desorbing said adsorbed aromatic from said zeolite whereby a stream enriched in said preferentially adsorbed aromatic is obtained.

2. The process of claim 1 wherein said type Y zeolite has a unit cell size of 24.60 to 24.70.

3. The process of claim 1 wherein said preferentially adsorbed component is paraxylene.

4. The process of claim 3 wherein said adsorption takes place in the liquid phase.

5. The process of claim 4 wherein said adsorption takes place in the liquid phase in the presence of inert carrier, said inert carrier being a liquid under adsorption conditions which may be readily separated from the $C_8$ product.

6. The process of claim 5 wherein said inert carrier is a $C_2$ to $C_{18}$ aliphatic compound.

7. The process of claim 4 wherein said adsorption takes place in the vapor phase.

8. The process of claim 1 wherein said desorption is effected with steam.

9. A process for preferentially adsorbing paraxylene from admixture with at least one compound selected from the group consisting of meta xylene, ortho xylene and ethyl benzene which comprises contacting said mixture under adsorption conditions with a type Y zeolite in which 70 to 98 percent of the sodium ions have been replaced by potassium ions, said zeolite having a unit cell size of 24.50 to 24.75 Angstroms wherein said paraxylene is preferentially adsorbed and desorbing said paraxylene from said zeolite.

10. The process of claim 9 wherein said adsorption takes place in the liquid phase and in the presence of an inert carrier.

11. The process of claim 9 wherein said desorption is effected with steam.

12. The process of claim 9 wherein said desorption is effected with a polar displacing agent.

13. The process of claim 9 wherein the mixture is passed over the zeolite at a rate of 0.1 to 5 W/hr/W and adsorption takes place at a temperature of 200° to 800° F.

* * * * *